March 28, 1961 G. R. IBLINGS 2,977,158
TRACTION DEVICE
Filed March 28, 1960 2 Sheets-Sheet 1
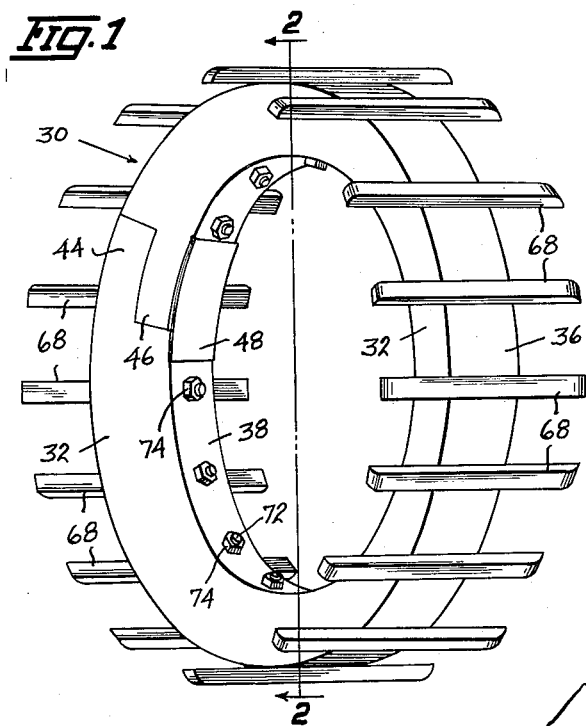
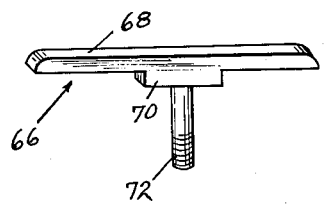
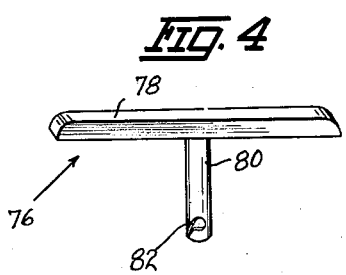
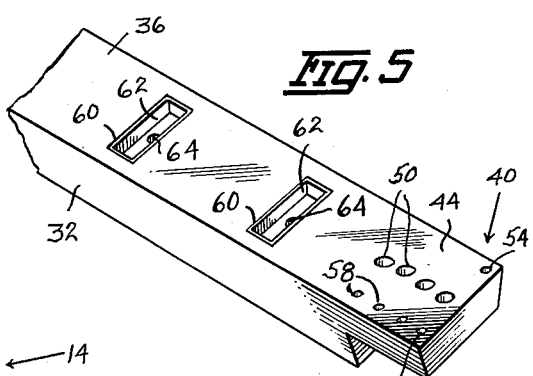
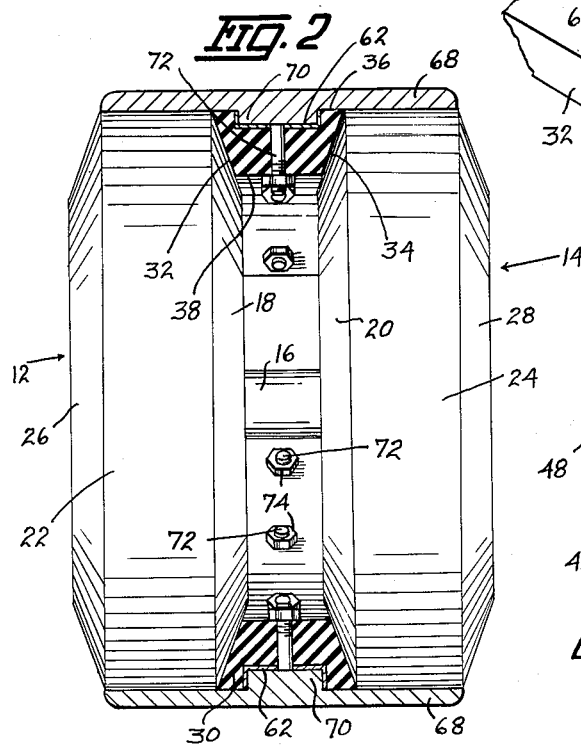
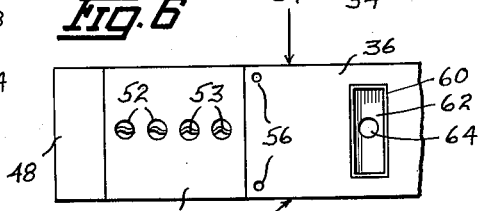
INVENTOR.
GLENN R. IBLINGS
BY Morton S. Adler
ATTORNEY.

March 28, 1961 G. R. IBLINGS 2,977,158
TRACTION DEVICE
Filed March 28, 1960 2 Sheets-Sheet 2
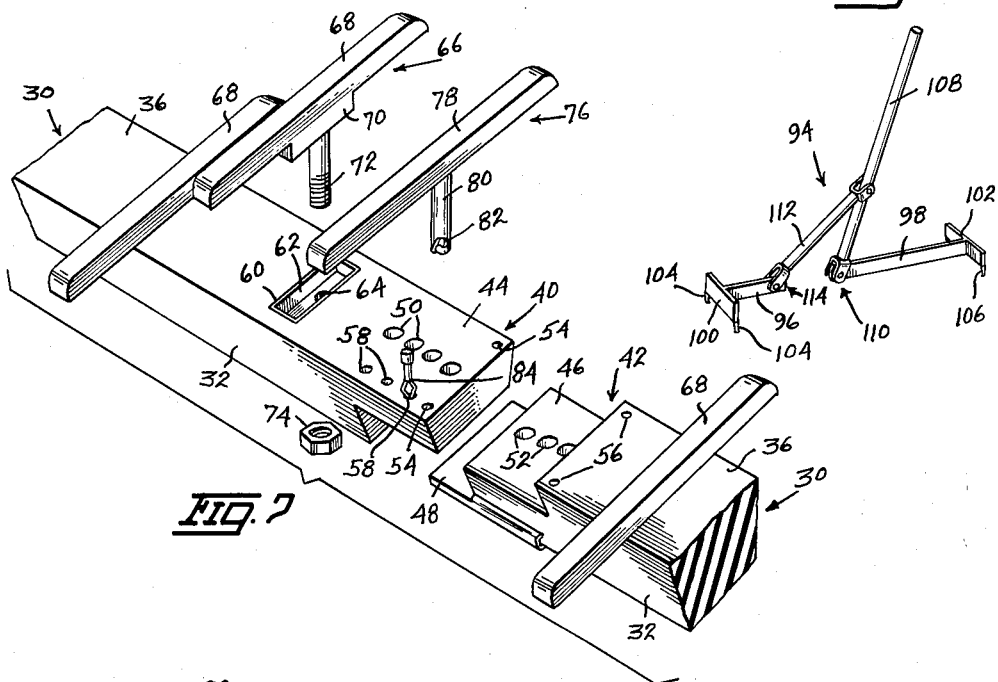
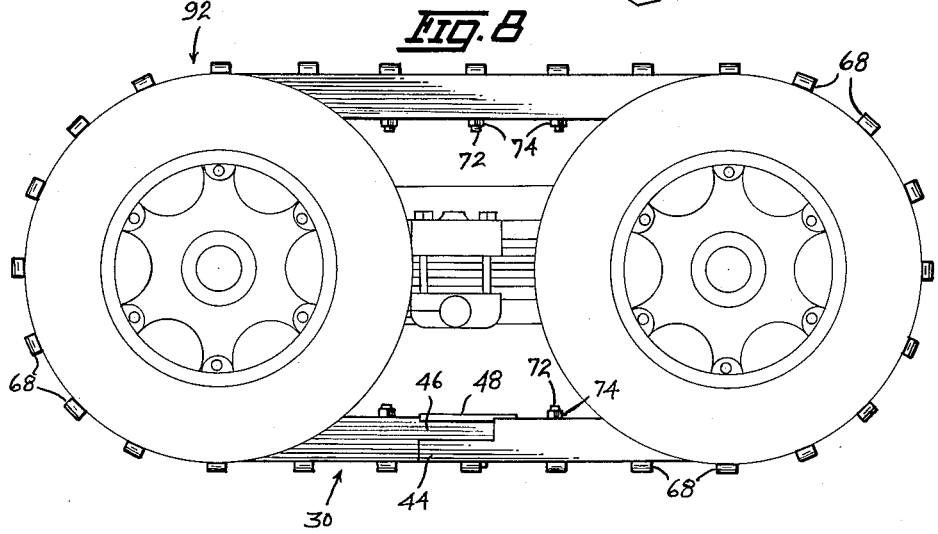
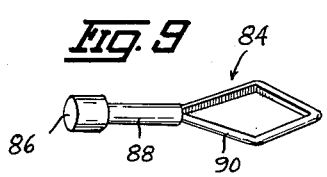
INVENTOR.
GLENN R. IBLINGS
BY Morton S. Adler
ATTORNEY.

United States Patent Office 2,977,158
Patented Mar. 28, 1961

2,977,158
TRACTION DEVICE
Glenn R. Iblings, 1008 E. Milwaukee Ave.,
Storm Lake, Iowa
Filed Mar. 28, 1960, Ser. No. 18,139
14 Claims. (Cl. 305—35)

This invention relates to an auxiliary traction device adapted for use with dual vehicle wheels and with tandem dual wheels.

One of the important objects contemplated herein is the provision of a belt mounted intermediate the tires on a set of dual wheels with the belt having longitudinally spaced transversely arranged traction bars positioned to lay upon the tire treads to promote the tractive efforts of the vehicle under difficult road conditions resulting from ice, snow, mud or sand.

Another object is to provide a traction device of the above class that can be mounted to and removed from a set of dual or tandem dual wheels without requiring the removal or jacking of any wheel.

A further object includes traction bars which are mounted so as not to turn or twist relative to the periphery of the tires and which are easily individually removable for replacement or repair.

Still another object is to provide a belt as characterized which is susceptible of adjustment to increase or decrease any slack therein.

Another object is to provide an auxiliary traction device for dual wheels that will provide a traction tread transversely of both tires and the normal space intermediate the tires to substantially increase the tractive effort of the vehicle under abnormal road conditions.

Further objects and the more obvious advantages of the invention will be mentioned or else appear plainly from the description which follows.

This invention consists of novel parts and combination of parts to be hereinafter described whereby the objects set forth are attained, as pointed out in the claims, and illustrated in the accompanying drawings, in which:

Fig. 1 is a perspective view of traction device or belt illustrating a preferred embodiment of this invention, Fig. 2 is an end view of a set of dual wheels showing this invention in section mounted thereto, Fig. 3 is a perspective view of one of the traction bars mounted to this belt, Fig. 4 is a perspective view of the traction bar used at the overlapping connecting point of the belt, Figs. 5 and 6 are fragmentary perspective views showing the joinable ends of the traction belt, Fig. 7 is a fragmentary exploded perspective view of the traction belt relative to its joinable ends and showing some of the traction bars, Fig. 8 is a side elevational view of a set of tandem dual wheels equipped with this invention, Fig. 9 is a perspective view of a lock pin, and Fig. 10 is a perspective view of a tool usable to facilitate joining the ends of the traction belt.

Referring to the drawings a set of dual wheels is illustrated in Fig. 2 by the spaced tires 12 and 14 on wheels (not shown) mounted to axle 16. The opposed inner sidewalls 18 and 20 of tires 12 and 14 are shown tapered in usual form to the respective treads 22 and 24 and of course the outer sidewalls 26 and 28 are similarly formed.

Traction devices usually in the form of chains applied to wheels of this type and often only to the outer wheel are inadequate under severe road conditions occasioned by heavy snow, mud or ice and, as indicated above, my invention is designed to materially increase the tractive effort of the vehicle under such conditions.

To accomplish my objectives, I use a resilient belt 30 of rubber or the like that may be of a material reinforced with cords or fabric similar to regular tire construction and which is of a V type in cross section presenting the tapered sides 32 and 34, top 36 and bottom 38 that is narrower relative to top 36. Belt 30 includes two joinable ends 40 and 42, which when joined as will later appear, makes belt 30 into endless form for mounting intermediate tires 12 and 14 in frictional engagement with sidewalls 18 and 20 as shown in Fig. 2. Belt 30 is designed for overlapping engagement at ends 40 and 42 for which purpose end 40 is notched at the underside to provide the overlap member 44 and end 42 is notched at the upper side to provide the underlap member 46. A support plate 48 clipped to the belt bottom 38 below the underlap 46 projects longitudinally outwardly therefrom as shown in Fig. 7. Portions 44 and 46 are provided with a plurality of centrally aligned longitudinally spaced holes or sockets 50 and 52 respectively and each socket 52 contains a diametrically arranged curved locking bar or rod 53 of a well known type. At each outer end corner of members 44 and 46 are the respective holes or sockets 54 and 56 respectively and on top 36 of member 44 there are longitudinally spaced holes 58 adjacent belt side 32 in relative parallel relationship to sockets 50 (Fig. 7).

In longitudinal spaced relationship on belt 30, I provide a plurality of elongated and preferably rectangular recesses or sockets 60 disposed transversely of the longitudinal axis of the belt and preferably lined with a light metal 62, and from the center of the bottom of each recess 60 a hole 64 extends through bottom 38 of the belt. Each recess 60 is designed to removably receive a traction bar 66 (Fig. 3) which includes an elongated bar 68 having a depending shoulder 70 secured to a threaded shank 72. Shank 72 is passed downwardly through hole 64 so that shoulder 70 seats in recess 60 and bar 68 is disposed transversely of belt 30 so as to project outwardly from sides 32 and 34. The threaded end of shank 72 is secured to bottom 38 by a nut 74. In this position, shoulder 70 is suitably locked into recess 60 to prevent turning or twisting of bar 68 relative to the tire treads 22 and 24.

Ends 40 and 42 are joined by overlapping member 44 and 46 until one hole 50 registers with one of the holes 52 for receiving a traction bar 76 (Fig. 4) that includes an elongated bar 78 similar to bar 68 and a depending shank 80 having a curved bayonet like slot 82 on the bottom. As shown the main part of slot 82 appears to be a transverse hole, but such slot defines, at each end, a curved path to the bottom of shank 80 so that there is also a slot across the bottom. Member 53 in sockets 52 is merely a rod of small diameter extending transversely thereof. Consequently, to engage member 53 through the upper portion of slot 82, shank 80 is positioned so that the slot across the bottom registers with member 53, then by rotating shank 53, slot 82 spirals down upon member 53 and becomes engaged therewith and cannot be removed unless the spiral turn is reversed. Thus, in place, member 78 will lie upon the tread of the tire the same as bar 68 shown in Fig. 7. It will thus be appreciated that as the tire rotates it would be possible for bar 78 to be turned or twisted relative to the periphery of the tread and such a turn could rotate shank 80 out of engagement with member 53. To prevent such rotation pin 84 as shown in Fig. 7 is inserted into the belt immediately adjacent one end of bar 78, such pin serving as a stop for rotation of member 78 in the direction required to disengage it from member 53. Pin 84 includes an enlarged head 86, a shank 88 and a projecting contractible spring element 90 which is designed for insertion and removable from the top or outer side of belt 30. Pin 84 is inserted in hole 58 so that head 86 engages one side of bar 78 to serve as a stop against the turning of the bar in a direction that would disengage slot 82 from bar 53. The locking means for ends 40 and 42 as described is a known expedient and no invention is claimed in the same per se.

Belt 30 is intended for mounting to dual wheels (Fig. 2) or tandem dual wheels 92 (Fig. 8) without the necessity of removing or jacking any wheels. Consequently, since belt 10 will completely fill the space between the tires on each set of duals, it will be appreciated that in mounting the belt, the joining of ends 40 and 42 will, of necessity, require handling the belt from the outer or top side 36. To facilitate this operation, I preferably employ a tool 94 (Fig. 10) which includes longitudinally aligned bars 96 and 98 each having on its outer end a respective cross bar 100 and 102 from which are depending hooks or claws, 104 and 106 respectively, spaced to correspond with the spacing of the respective holes 54 and 56 on members 44 and 46. A handle 108 is pivotally secured at one end to the inner end 110 of bar 98 and a rigid link 112 is pivotally secured at respective ends to the inner end 114 of bar 96 and to handle 108 intermediate the ends thereof. It will thus be appreciated that movement of handle 108 can selectively move hooks 104 and 106 toward and away from each other. Thus, in joining ends 40 and 42, plate 48 serves to support member 44 relative to member 46 and to provide a guide base on which member 44 can slide. Hooks 104 and 106 are engaged with holes 54 and 56, or vice versa, and by movement of handle 108, suitable holes 50 and 52 can be placed in registering position relative to the amount of slack, or lack of slack desired. When this position has been obtained, bar 76 and pin 84 are installed as described and tool 94 is removed. Members 44 and 46 may of course be joined without tool 94, but the operation is considerably expedited by using it. Belt 30 is mounted on tandem duals 92 in the same manner as above and will, of course, be of greater length for such purpose.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A traction device for dual wheels having spaced pneumatic tires with annular treads and respective adjacent sidewalls, said traction device comprising an elongated resilient belt having joinable ends for forming an endless belt adapted for frictional engagement with said adjacent sidewalls so as to fill in the spacing intermediate said tires, means for securing said joinable ends together in the same plane, said belt presenting an outer surface on the same plane as said treads, a plurality of elongated traction bars removably secured to said belt in longitudinal spaced relationship thereon and transversely arranged thereon so as to lie on and transversely of said belt and said treads, and means to prevent twisting or turning of said traction bars relative to the periphery of said treads.

2. A traction device for dual wheels having spaced pneumatic tires with annular treads and respective adjacent sidewalls, said traction device comprising an elongated resilient belt having joinable ends for forming an endless belt adapted for frictional engagement with said adjacent sidewalls so as to fill in the spacing intermediate said tires, means for securing said joinable ends together in the same plane, said belt presenting respective outer and inner annular surfaces with said outer surface being on the same plane as said treads, a plurality of sockets longitudinally spaced in said outer surface, each socket having a hole extending through said belt to said inner surface, a plurality of elongated traction bars each having a centrally depending shoulder from which a shank member depends, said shank members insertable through a hole in said belt so that the shoulder thereon seats in said socket and said traction bar is transversely disposed on said belt and said treads, and means to removably secure said shanks to said belt from said inner surface.

3. A device as defined in claim 2 wherein said sockets are metal lined.

4. A traction device for dual wheels having spaced pneumatic tires with annular treads and respective adjacent sidewalls, said traction device comprising an elongated resilient belt having joinable ends for forming an endless belt adapted for frictional engagement with said adjacent sidewalls so as to fill in the spacing intermediate said tires, means for longitudinally adjustably securing said joinable ends together in the same plane, said belt presenting an outer surface on the same plane as said treads, a plurality of elongated traction bars removably secured to said belt in longitudinal spaced relationship thereon and transversely arranged thereon so as to lie on and transversely of said belt and said treads, and means to prevent twisting or turning of said traction bars relative to the periphery of said treads.

5. A traction device for dual wheels having spaced pneumatic tires with annular treads and respective adjacent sidewalls, said traction device comprising an elongated resilient belt having joinable ends for forming an endless belt adapted for frictional engagement with said adjacent sidewalls so as to fill in the spacing intermediate said tires, said belt presenting an outer surface on the same plane as said treads, a plurality of elongated traction bars removably secured to said belt in longitudinal spaced relationship thereon and transversely arranged thereon so as to lie on and transversely of said belt and said treads, one of said joinable ends having an overlap and the other an underlap for overlapping engagement with each other, said overlap and underlap provided with centrally aligned longitudinally spaced holes adapted to be selectively registered, one of said traction bars having shank means removably securable in said registering holes, and means to prevent twisting or turning of said traction bars relative to the periphery of said treads.

6. A device as defined in claim 5 including a longitudinally projecting support plate on said underlap for supporting and guiding said overlap when said belt ends are being joined.

7. A traction device for dual wheels having spaced pneumatic tires with annular treads and respective adjacent sidewalls, said traction device comprising an elongated resilient belt having joinable ends for forming an endless belt adapted for frictional engagement with said adjacent sidewalls so as to fill in the spacing intermediate said tires, said belt presenting an outer surface on the same plane as said treads, a plurality of elongated traction bars removably secured to said belt in longitudinal spaced relationship thereon and transversely arranged thereon so as to lie on and transversely of said belt and said treads, means to prevent twisting or turning of said traction bars relative to the periphery of said treads, one of said joinable ends having an overlap and the other an underlap for overlapping engagement with each other, said overlap and underlap provided with centrally aligned longitudinally spaced holes adapted to be selectively registered, one of said traction bars having shank means removably securable in said registering holes, and a locking pin removably insertable into said belt so as to engage said last mentioned traction bar and limit its turning in one direction relative to said treads.

8. A device as defined in claim 7 wherein said locking pin is insertable in and removable from said belt from said outer surface.

9. A traction device for dual wheels having spaced pneumatic tires with annular treads and respective adjacent sidewalls, said traction device comprising an elongated resilient belt having joinable ends for forming an endless belt adapted for frictional engagement with said adjacent sidewalls so as to fill in the spacing intermediate said tires, means for temporarily engaging and aligning said joinable ends, means for securing said joinable ends together in the same plane, said belt presentnig an outer surface on the same plane as said treads, a plurality of elongated traction bars removably secured to said belt in longitudinal spaced relationship thereon and transversely arranged thereon so as to lie on and transversely of said belt and said treads, and means to prevent twisting or turning of said traction bars relative to the periphery of said treads.

10. A traction device for dual wheels having spaced pneumatic tires with annular treads and respective adjacent sidewalls, said traction device comprising an elongated resilient belt having joinable ends for forming an endless belt adapted for frictional engagement with said adjacent sidewalls so as to fill in the spacing intermediate said tires, said belt presenting an outer surface on the same plane as said treads, a plurality of elongated traction bars removably secured to said belt in longitudinal spaced relationship thereon and transversely arranged thereon so as to lie on and transversely of said belt and said treads, one of said joinable ends having an overlap and the other an underlap for overlapping engagement with each other, said overlap and underlap provided with centrally aligned longitudinally spaced holes adapted to be selectively registered, means for temporarily engaging and aligning said overlap and underlap, one of said traction bars having shank means removably securable in said registering holes, and means to prevent twisting or turning of said traction bars relative to the periphery of said treads.

11. A traction device for dual wheels having spaced tires with annular treads and respective adjacent sidewalls, said traction device comprising an endless belt in frictional engagement with said sidewalls so as to fill in the spacing therebetween, said belt presenting an outer surface on the same plane as said treads, a plurality of elongated traction bars removably secured to said belt in longitudinal spaced relationship thereon and arranged transversely of the longitudinal axis thereof, and said traction bars projecting from opposite sides of said belt so as to lie transversely on and across said respective treads.

12. A traction device for dual wheels having spaced tires with annular treads and respective adjacent sidewalls, said traction device comprising an endless belt in frictional engagement with said sidewalls so as to fill in the spacing therebetween, said belt presenting an outer surface on the same plane as said treads, a plurality of elongated traction bars removably secured to said belt in longitudinal spaced relationship thereon and arranged transversely of the longitudinal axis thereof, and said traction bars projecting from opposite sides of said belt so as to lie transversely on and across said respective treads, and means to prevent twisting or turning of said traction bars relative to the periphery of said treads.

13. A traction device for dual wheels having spaced tires with annular treads and respective adjacent sidewalls, said traction device comprising an endless belt in frictional engagement with said sidewalls so as to fill in the spacing therebetween throughout the entire circumference of said wheels, said belt presenting an outer surface on the same plane as said treads, a plurality of elongated traction bars removably secured to said belt in longitudinal spaced relationship thereon and arranged transversely of the longitudinal axis thereof, and said traction bars projecting from opposite sides of said belt so as to lie transversely on and across said respective treads.

14. A traction device for dual wheels having spaced tires with annular treads and respective adjacent sidewalls, said traction device comprising an endless belt for mounting intermediate said tires, said belt presenting an outer surface on the same plane as said treads, a plurality of traction bars on said belt, and said traction bars disposed transversely of the longitudinal axis of said belt so as to project therefrom in two opposite directions and lie transversely on and across said respective treads.

References Cited in the file of this patent

UNITED STATES PATENTS

| | | |
|---|---|---|
| 1,304,375 | Robinet | May 20, 1919 |
| 1,438,859 | Rimailho | Dec. 12, 1922 |
| 1,456,348 | White | May 22, 1923 |
| 2,534,679 | Place | July 21, 1945 |
| 2,667,349 | Jacobson | Jan. 26, 1954 |
| 2,898,965 | Eddy | Aug. 11, 1959 |
| 2,936,196 | Baudelot et al. | May 10, 1960 |

FOREIGN PATENTS

| | | |
|---|---|---|
| 15,362 | Australia | Aug. 30, 1928 |